(12) United States Patent
Kawai

(10) Patent No.: US 9,969,850 B2
(45) Date of Patent: May 15, 2018

(54) METHOD FOR PRODUCING MODIFIED POLYMER, AND RUBBER COMPOSITION

(71) Applicant: Toyo Tire & Rubber Co., Ltd., Osaka-shi, Osaka (JP)

(72) Inventor: Nobutomo Kawai, Osaka (JP)

(73) Assignee: TOYO TIRE & RUBBER CO., LTD., Itami-shi (JP)

( * ) Notice: Subject to any disclaimer, the term of this patent is extended or adjusted under 35 U.S.C. 154(b) by 344 days.

(21) Appl. No.: 14/771,900

(22) PCT Filed: Mar. 7, 2014

(86) PCT No.: PCT/JP2014/001285
§ 371 (c)(1),
(2) Date: Sep. 1, 2015

(87) PCT Pub. No.: WO2014/136458
PCT Pub. Date: Sep. 12, 2014

(65) Prior Publication Data
US 2016/0009875 A1    Jan. 14, 2016

(30) Foreign Application Priority Data

Mar. 7, 2013 (JP) ................. 2013-045810
Mar. 7, 2013 (JP) ................. 2013-045812
Mar. 7, 2013 (JP) ................. 2013-045815
Mar. 7, 2013 (JP) ................. 2013-045816

(51) Int. Cl.
| | |
|---|---|
| C08C 19/08 | (2006.01) |
| C08J 3/24 | (2006.01) |
| C08F 16/34 | (2006.01) |
| C08F 16/36 | (2006.01) |
| C08F 216/36 | (2006.01) |
| C08F 116/36 | (2006.01) |
| C08F 216/34 | (2006.01) |

(Continued)

(52) U.S. Cl.
CPC ................. *C08J 3/24* (2013.01); *B60C 1/00* (2013.01); *C08C 19/08* (2013.01); *C08C 19/25* (2013.01); *C08C 19/44* (2013.01); *C08F 16/34* (2013.01); *C08F 16/36* (2013.01); *C08F 116/34* (2013.01); *C08F 116/36* (2013.01); *C08F 216/34* (2013.01); *C08F 216/36* (2013.01); *C08K 3/013* (2018.01); *C08K 3/04* (2013.01); *C08K 3/06* (2013.01); *C08K 3/22* (2013.01); *C08K 3/36* (2013.01); *C08K 5/09* (2013.01); *C08K 5/18* (2013.01); *C08K 5/47* (2013.01); *C08K 5/548* (2013.01); *C08L 7/02* (2013.01); *C08L 15/00* (2013.01); *C08L 91/00* (2013.01); *C08J 2307/02* (2013.01)

(58) Field of Classification Search
CPC ......... C08C 19/08; C08C 19/25; C08F 16/34; C08F 16/36; C08F 116/34; C08F 116/36; C08F 216/34; C08F 216/36
See application file for complete search history.

(56) References Cited

U.S. PATENT DOCUMENTS 4,851,556 A * 7/1989 Siegmeier .............. C08C 19/06
549/525
5,015,692 A * 5/1991 Takao .................... C08C 19/42
525/102

(Continued)

FOREIGN PATENT DOCUMENTS

JP      47-39183 A    12/1972
JP      8-81505 A     3/1996

(Continued)

OTHER PUBLICATIONS

Office Action dated Jun. 2, 2016, issued in counterpart Chinese Patent Application No. 201480012835.7, with abridged translation. (8 pages).

(Continued)

*Primary Examiner* — Peter D. Mulcahy
(74) *Attorney, Agent, or Firm* — Westerman, Hattori, Daniels & Adrian, LLP

(57) ABSTRACT

Acido-basic properties of a system containing a polymer obtained by decomposing by oxidative cleavage of a carbon-carbon double bond, and a trifunctional molecule having an alkoxysilyl group in the structure as represented by the formula (A) are changed such that the system is changed into a basic system when the system is acidic and the system is changed into an acidic system when the system is basic to combine the decomposed polymer and the trifunctional molecule, thereby introducing the alkoxysilyl group into the main chain. Furthermore, acido-basic properties of a system containing a polymer obtained by decomposing by oxidative cleavage of a carbon-carbon double bond to decrease the molecular weight, and a functional molecule having an alkoxysilyl group as represented by the formula (a) are changed in the same manner as above to combine the decomposed polymer and the functional molecule, thereby introducing the alkoxysilyl group in a molecular terminal.

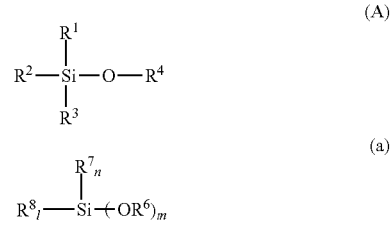

19 Claims, No Drawings

(51) Int. Cl.
*C08F 116/34* (2006.01)
*B60C 1/00* (2006.01)
*C08C 19/44* (2006.01)
*C08C 19/25* (2006.01)
*C08K 3/04* (2006.01)
*C08K 3/36* (2006.01)
*C08L 15/00* (2006.01)
*C08L 7/02* (2006.01)
*C08K 3/06* (2006.01)
*C08K 3/22* (2006.01)
*C08K 5/09* (2006.01)
*C08K 5/18* (2006.01)
*C08K 5/47* (2006.01)
*C08K 5/548* (2006.01)
*C08L 91/00* (2006.01)

(56) References Cited

U.S. PATENT DOCUMENTS

| | | | |
|---|---|---|---|
| 5,622,998 A | 4/1997 | Tanaka et al. | |
| 9,175,124 B2* | 11/2015 | Chaboche | B60C 1/0016 |
| 2009/0203843 A1* | 8/2009 | Fukuoka | C08C 19/44 |
| | | | 525/105 |
| 2010/0056710 A1 | 3/2010 | Oshima | |
| 2010/0063202 A1* | 3/2010 | Halasa | C08C 19/44 |
| | | | 524/572 |
| 2011/0028653 A1* | 2/2011 | Wang | C08F 8/00 |
| | | | 525/207 |
| 2012/0252966 A1* | 10/2012 | Ito | C08C 19/25 |
| | | | 524/575 |
| 2012/0323037 A1* | 12/2012 | Pilard | C08C 19/08 |
| | | | 560/262 |
| 2013/0023624 A1* | 1/2013 | Sekikawa | C08C 19/44 |
| | | | 524/572 |
| 2014/0364536 A1 | 12/2014 | Kawai | |
| 2016/0362504 A1* | 12/2016 | Dire | B60C 1/0016 |

FOREIGN PATENT DOCUMENTS

| | | |
|---|---|---|
| JP | 2001-354773 A | 12/2001 |
| JP | 2004-359716 A | 12/2004 |
| JP | 2006-152157 A | 6/2006 |
| JP | 2010-77415 A | 4/2010 |
| JP | 2011-89066 A | 5/2011 |
| JP | 2011-225681 A | 11/2011 |
| JP | 2012-251085 A | 12/2012 |
| JP | 2013-10873 A | 1/2013 |
| WO | 2012/77633 A1 | 6/2012 |
| WO | 2013/118496 A1 | 8/2013 |

OTHER PUBLICATIONS

Internatiocal Search Report dated May 20, 2014, issued in counterpart application No. PCT/JP2014/001285 (2 pages).

* cited by examiner

METHOD FOR PRODUCING MODIFIED POLYMER, AND RUBBER COMPOSITION

TECHNICAL FIELD

The present invention relates to a method for producing a modified polymer, a diene polymer, a rubber composition, and a pneumatic tire.

BACKGROUND ART

Technology in which a terminal structure is modified by utilizing a termination reaction in the last stage of polymerization, a functional group is directly added to a side chain, or a polymer is grafted to add a functional group is used as a technology of changing properties of natural polymer such as natural rubber, or a synthesized polymer (for example, PTLs 1 and 2 below).

However, regardless of solution polymerization or emulsion polymerization, a method of simply and easily introducing an alkoxysilyl group in a main chain structure or a molecular terminal by rearranging a main structure of a polymer is not yet obtained. Furthermore, in the conventional technology, a decrease in a molecular weight may unintentionally occur, and it is considered that the decrease adversely affects properties, depending on an object to be used.

Regarding a depolymerized natural rubber useful as an adhesive, a pressure-sensitive adhesive, a sealant, a caulking agent, a plasticizer and the like, it is disclosed in PTL 3 mentioned below to produce a liquid depolymerized natural rubber having a number average molecular weight of from 2,000 to 50,000 by air oxidation of a deproteinized natural rubber dissolved in an organic solvent in the presence of a metal catalyst to perform depolymerization. This PTL discloses that a molecular chain having a carbonyl group in one terminal and a formyl group in other terminal is formed by the decomposition of a main chain by air oxidation, and the formyl group is then recombined by aldol condensation, but does not disclose that the carbonyl group is recombined. Furthermore, in this PTL, depolymerization is conducted in a solution of an organic solvent, and it is not described that the recombination is performed by changing a system containing decomposed polymers into an acidic or basic system. Furthermore, the production method is to obtain a telechelic liquid rubber having carbonyl groups in both terminals, has an object to obtain a liquid rubber obtained by decreasing the molecular weight of natural rubber, and does not have an object to modify a polymer by performing recombination of a main chain structure while controlling a molecular weight.

Attempt is made to modify wet grip performance (hereinafter sometimes referred to as "wet performance"), low fuel consumption performance (rolling resistance) and the like of a tire by operating polarity by grafting onto a polymer, modification of a terminal, addition of a functional group, and the like as described above (for example, PTLs 1 and 4). Modification such as grafting onto a polymer, addition of a functional group and the like has the effect to increase a grass transition point (Tg), and concurrently is a method of improving low fuel consumption performance by an interaction between the functional group and a filler.

However, wet performance and low fuel consumption performance of a tire are originally performances to be antinomic, it is difficult to greatly improve those performances simultaneously, and sufficient result is not yet obtained.

On the other hand, a rubber after vulcanization has problems of deterioration of a crosslinked structure by heat, light or deformation, and deformation by the deterioration, and various attempts are made for the improvement. In particular, improvement of reversion in natural rubber and improvement of interaction between natural rubber and a filler are required, and in addition to this, improvement of low fuel consumption performance, and the like are also required. To improve deterioration of a rubber after vulcanization as describe above, for example, introduction of chemicals suppressing deterioration of an age resister and the like, and adjustment of vulcanization components such as sulfur and accelerator, and a crosslinking agent are conducted as the means of improving heat and light decomposition of polymer components, and decomposition and change of a sulfur crosslinked structure (for example, PTL 2).

However, there is no example that the problem of deterioration of a rubber after vulcanization has been solved by grafting onto a polymer, modification of a terminal, addition of a functional group, and the like.

CITATION LIST

Patent Literature

PTL 1: JP-A-2006-152157
PTL 2: JP-A-2011-225681
PTL 3: JP-A-08-081505
PTL 4: JP-A-2004-359716

SUMMARY OF INVENTION

Technical Problem

The present invention has been made in view of the above, and has an object to provide a novel modified polymer that can solve the above problems and a method for producing the same. The present invention further has an object to provide a rubber composition by which a tire having improved wet grip performance and low fuel consumption performance as compared with the conventional tires is obtained, by using the modified polymer.

Specifically, the present invention has an object to provide a method for producing a modified polymer that can simply and easily introduce an alkoxysilyl group in a main chain structure of a polymer, and a novel diene polymer having an alkoxysilyl group introduced in a main chain structure.

The present invention further has an object to provide a method for producing a modified polymer that can simply and easily introduce an alkoxysilyl group in a molecular terminal of a polymer, and a novel diene polymer having an alkoxysilyl group introduced in a molecular terminal The present invention further has an object to provide a rubber composition for a tire that greatly improves reversion of a crosslinked rubber, deterioration resistance, wet performance, low fuel consumption performance and the like by using a diene rubber polymer having a different structure introduced in a main chain moiety as described above.

The present invention further has an object to provide a rubber composition for a tire that improves an interaction between a rubber and a filler by using a diene rubber polymer having an alkoxysilyl group in at least one molecular terminal, thereby greatly improving wet performance, low fuel consumption performance and other properties.

Solution to Problem

A method for producing a modified polymer of the present invention is a method for obtaining a modified polymer having an alkoxysilyl group introduced in a main chain or at least one molecular terminal by changing acido-basic properties of a system containing a polymer obtained by decomposing a polymer having a carbon-carbon double bond in a main chain by oxidative cleavage of the carbon-carbon double bond to decrease the molecular weight, and a functional molecule having an alkoxysilyl group in the structure such that the system is changed into a basic system when the system is acidic and the system is changed into an acidic system when the system is basic to combine the decomposed polymer and the functional molecule.

In a first embodiment, the production method is a method for obtaining a modified polymer having an alkoxysilyl group introduced in a main chain by changing acido-basic properties of a system containing a polymer obtained by decomposing a polymer having a carbon-carbon double bond in a main chain by oxidative cleavage of the carbon-carbon double bond to decrease the molecular weight, and a trifunctional molecule having an alkoxysilyl group in the structure as represented by the following formula (A) such that the system is changed into a basic system when the system is acidic and the system is changed into an acidic system when the system is basic to combine the decomposed polymer and the trifunctional molecule.

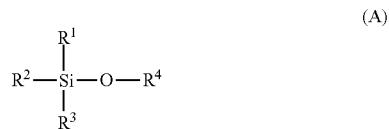
(A)

In the formula (A), $R^1$, $R^2$ and $R^3$ each represent an aldehyde group or a carbonyl group, and $R^4$ represents an alkyl group having from 1 to 10 carbon atoms.

In the production method of this embodiment, it is preferred that the decomposed polymer contains a structure as represented by the following formula (1) in a terminal.

(1)

In the formula (1), $R^5$ represents a hydrogen atom or a methyl group.

The trifunctional molecule having the alkoxysilyl group in the structure as represented by the formula (A) can be obtained by oxidative cleavage of a carbon-carbon double bond in the trifunctional molecule having at least one vinyl group.

Furthermore, according to the production method of this embodiment, a modified polymer having at least one of bonding structures as represented by the following formulae (2) to (5) is obtained.

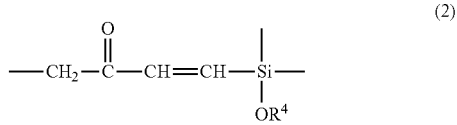
(2)

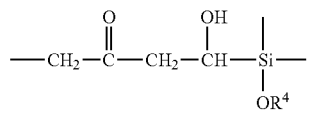
(3)

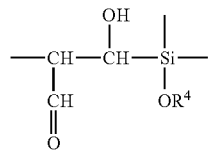
(4)

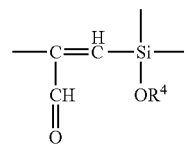
(5)

In the formulae (2) to (5), $R^4$ represents an alkyl group having from 1 to 10 carbon atoms.

In the production method of this embodiment, the carbon-carbon double bond can be subjected to oxidative cleavage using, for example, periodic acid.

By the production method of this embodiment, a modified polymer having an alkoxysilyl group introduced in a polymer main chain is obtained, and an introduction rate of the alkoxysilyl group can be, for example, from 1 to 5 mol %.

In a second embodiment, the method for producing a modified polymer of the present invention is a method for obtaining a modified polymer having an alkoxysilyl group introduced in at least one terminal of a molecule by changing acido-basic properties of a system containing a polymer obtained by decomposing a polymer having a carbon-carbon double bond in a main chain by oxidative cleavage of the carbon-carbon double bond to decrease the molecular weight, and a functional molecule having an alkoxysilyl group in the structure as represented by the following formula (a) such that the system is changed into a basic system when the system is acidic and the system is changed into an acidic system when the system is basic to combine the decomposed polymer and the functional molecule.

(a)

In the formula (a), $R^6$ represents an alkyl group having from 1 to 10 carbon atoms, $R^7$ represents an aldehyde group or a carbonyl group, $R^8$ represents an alkyl group having from 1 to 10 carbon atoms, m is a number of from 1 to 3, n is a number of 1 or 2, and l is a number of from 0 to 2.

In the production method of this embodiment, it is preferred that the decomposed polymer contains a structure as represented by the following formula (11) in a terminal

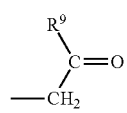
(11)

In the formula (11), $R^9$ represents a hydrogen atom or a methyl group.

The functional molecule having an alkoxysilyl group in the structure as represented by the formula (a) can be obtained by oxidative cleavage of a carbon-carbon double bond in the functional molecule having at least one vinyl group.

According to the second embodiment of the production method, a modified polymer having a terminal group as represented by the following formula (b) in at least one molecular terminal can be obtained.

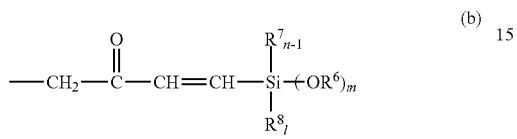
(b)

In the formula (b), $R^6$, $R^7$, $R^8$, m, n and l are the same as $R^6$, $R^7$, $R^8$, m, n and l in the formula (a), respectively.

In the production method of the second embodiment, the carbon-carbon double bond can be subjected to oxidative cleavage using, for example, periodic acid.

According to the production of the second embodiment, a modified polymer having an alkoxysilyl group introduced in at least one molecular terminal is obtained. Introduction rate of the alkoxysilyl group in the modified polymer can be, for example, from 0.01 to 5 mol %.

In any embodiment of the above production methods, the reaction system can be an aqueous emulsion.

Diene rubber polymer is preferably used as the polymer having the carbon-carbon double bond in a main chain, and natural rubber or synthetic isoprene rubber is more preferred.

The diene polymer of the present invention can be a diene polymer in which at least one of bonding structures as represented by the following formulae (2) to (5) is present in the molecule and diene polymer chains are linked through those linking groups.

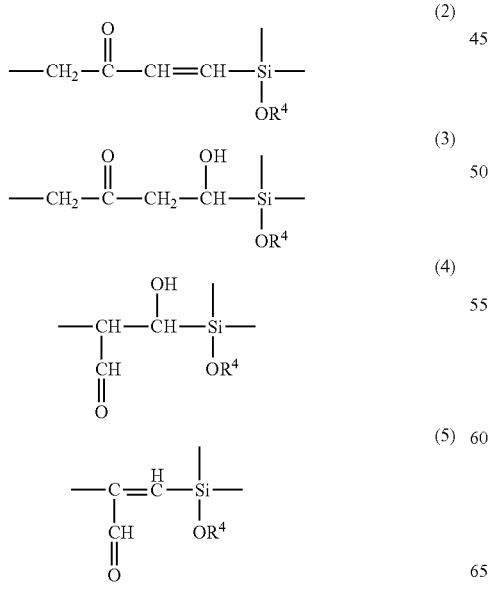

In the formulae (2) to (5), $R^4$ represents an alkyl group having from 1 to 10 carbon atoms.

The diene polymer of the present invention can be a diene polymer having a terminal group as represented by the following formula (b) in at least one molecular terminal of the diene polymer chain.

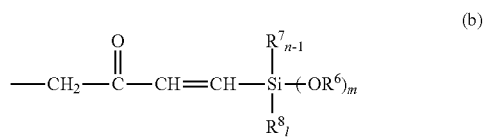
(b)

In the formula (b), $R^6$, $R^7$, $R^8$, m, n and l are the same as $R^6$, $R^7$, $R^8$, m, n and l in the formula (a), respectively.

It is preferred that the diene polymer chain is a diene rubber polymer chain.

In a first embodiment, the rubber composition for a tire of the present invention comprises 100 parts by mass of a modified diene rubber component that is a diene polymer having diene polymer chains linked through a linking group containing at least one of the bonding structures as represented by the formulae (2) to (5) and containing from 1 to 5 mol % of an alkoxysilyl group in the main chain, and from 5 to 150 parts by mass of a filler.

It is preferred that the modified diene rubber is a modified isoprene rubber having polyisoprene chains as represented by the following formula (9) linked through the linking group.

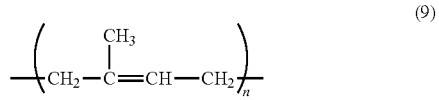

In the formula (9), n is an integer of 1 or more.

In the second embodiment, the rubber composition for a tire of the present invention comprises 100 parts by mass of a modified diene rubber component that is a diene polymer having the terminal group as represented by the formula (b) in at least one molecular terminal and containing from 0.01 to 5 mol % of an alkoxysilyl group, and from 5 to 150 parts by mass of a filler.

It is preferred that the modified diene rubber is a modified isoprene rubber having polyisoprene chains as represented by the following formula (19) linked through a bonding structure as represented by any of the following formulae (12) to (15).

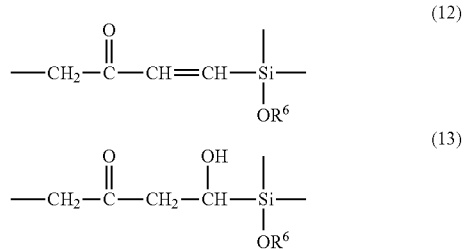

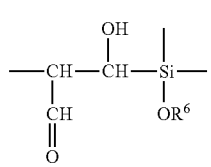

(14)

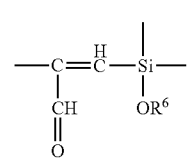

(15)

In the formulae (12) to (15), $R^6$ represents an alkyl group having from 1 to 10 carbon atoms.

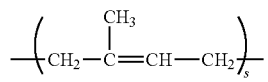

(19)

In the formula (19), s is an integer of 1 or more.

In the rubber composition of any of the above embodiments, it is preferred that silica is contained as a filler in an amount of from 5 to 80 parts by mass per 100 parts by mass of the modified diene rubber component.

Furthermore, it is preferred that carbon black is contained as a filler in an amount of from 5 to 80 parts by mass per 100 parts by mass of the modified diene rubber component.

A pneumatic tire can be manufactured using the rubber composition of the present invention, and in such a case, the rubber composition is preferably used in a tread.

Advantageous Effects of Invention

According to the production method of the present invention, a polymer is decomposed by oxidative cleavage of a double bond in a main chain to once reduce its molecular weight, and a system containing the decomposed polymers and a trifunctional molecule having an alkoxysilyl group in the structure as represented by the formula (A) is changed into an acidic system or a basic system to combine those, whereby the alkoxysilyl group can be easily incorporated in the main chain structure of the polymer. Thus, since a crosslinking point is formed by incorporating the alkoxysilyl group in the main chain structure, sulfur crosslinking of a polymer such as natural rubber is compensated, thereby enabling to improve the properties.

Alternatively, a polymer is decomposed by oxidative cleavage of a double bond in a main chain to once reduce its molecular weight, and a system containing the decomposed polymers and a functional molecule having an alkoxysilyl group in the structure as represented by the formula (a) is changed into a basic system when the system is acidic or into a acidic system when the system is basic to combine those, thereby the alkoxysilyl group can be easily incorporated in the molecular terminal of the polymer.

According to the rubber composition for a tire of the present invention, reversion of a crosslinked rubber, deterioration resistance, wet performance and low fuel consumption performance of a tire, and the like can be greatly improved simultaneously by using the diene rubber component having an alkoxysilyl group in the main chain structure. This is considered that by introducing a trifunctional molecule (monomer or polymer) having an aldehyde or carbonyl structure in a functional group in a recombination reaction after a polymer dissociation reaction, the alkoxysilyl group is incorporated in a main chain to form a crosslinking point, thereby compensating sulfur crosslinking. Furthermore, it is considered that improvement of filler compatibility by the introduction of an alkoxysilyl group contributes to the above effect.

The rubber composition for a tire of the present invention can greatly improve wet performance and low fuel consumption performance of a tire simultaneously also by using a diene rubber component having an alkoxysilyl group in a molecular terminal. This is considered that compatibility between the diene rubber and the filler is improved by the introduction of an alkoxysilyl group.

DESCRIPTION OF EMBODIMENTS

Items for carrying out the present invention are described in detail below.

In the first embodiment of the production method of the present invention, a modified polymer having an alkoxysilyl group introduced in a main chain structure of a polymer is produced.

In this embodiment, the polymer to be modified is a polymer containing a carbon-carbon double bond in a main chain, and is preferably a diene polymer, and more preferably a diene rubber polymer. The diene polymer is a polymer obtained by using a conjugated diene compound such as butadiene, isoprene, chloroprene, 2,3-dimethyl-1,3-butadiene, 2-methyl-1,3-pentadiene or 1,3-hexadiene as at least a part of monomers. Those conjugated diene compounds may be used in one kind or by combining two or more kinds.

The diene polymer includes a copolymer of the conjugated diene compound and other monomer other than the conjugated diene compound. The other monomer includes various vinyl compounds such as acrylonitrile and acrylic acid ester. Those vinyl compounds may be used in one kind or as mixtures of two or more kinds.

In more detail, various rubber polymers having isoprene unit and/or butadiene unit in the molecule are preferred as the diene rubber polymer, and examples thereof include natural rubber (NR), synthetic isoprene rubber (IR), butadiene rubber (BR), styrene-butadiene rubber (SBR), nitrile rubber (NBR) and butadiene-isoprene copolymer rubber. Of those, natural rubber and synthetic isoprene rubber are preferably used.

The diene rubber polymer to be modified is preferably solid at ordinary temperature (23° C.), and therefore, the diene rubber polymer having a number average molecular weight of 60,000 or more is preferred. The term "solid" used herein means the state free of fluidity, and the reason for this is that the rubber polymer does not undergo plastic deformation in the state that force is not applied at ordinary temperature when directly processing the rubber polymer as a material. The number average molecular weight of the diene polymer is preferably from 60,000 to 1,000,000, more preferably from 80,000 to 800,000, and still more preferably from 100,000 to 600,000.

As the polymer to be modified, the polymer dissolved in a solvent can be used, but it is preferred to use an aqueous emulsion in a micelle state in water that is a protonic solvent, that is, a latex. By using an aqueous emulsion, after decomposing the polymer, a binding reaction with a trifunctional molecule can be induced by changing acido-basic properties of a reaction field while maintaining the state. The concentration of the aqueous emulsion (solid concentration of a polymer) is not particularly limited, but is preferably from 5 to 70 mass %, and more preferably from 10 to 50 mass %. Where the solid concentration is too high, emulsion stability is deteriorated, and micelle is easy to be broken by pH fluctuation of a reaction field. This is not suitable for a reaction. On the other hand, where the solid concentration is too small, reaction rate becomes slow, resulting in poor practical use.

Oxidizing agent can be used for oxidative cleavage of a carbon-carbon double bond of the polymer. For example, the oxidative cleavage can be performed by adding an oxidizing agent to an aqueous emulsion of the polymer, followed by stirring. Examples of the oxidizing agent include manganese compounds such as potassium permanganate or manganese oxide; chromium compounds such as chromic acid or chromium trioxide; peroxides such as hydrogen peroxide; perhalogen acids such as periodic acid; and oxygens such as ozone or oxygen. Of those, periodic acid is preferably used. In performing oxidative cleavage, metal type oxidation catalysts such as a chloride of a metal such as cobalt, copper or iron, a salt of these metals or a complex of these metals with an organic compound may be used together, and for example, air oxidation may be performed in the presence of the metal type oxidation catalyst.

In the case of performing oxidative cleavage of two or more kinds of the diene polymers, each polymer may be subjected to oxidative cleavage by adding the respective oxidizing agents in individual systems, and alternatively, two or more kinds of polymers may be previously mixed, followed by addition of an oxidizing agent to the resulting mixture, thereby subjecting the polymers to oxidative cleavage together.

The polymer is decomposed by the oxidative cleavage, and polymers having a carbonyl group (>C=O) or a formyl group (—CHO) at the terminal are obtained. In the case where the polymer to be modified has an isoprene unit and a butadiene unit, a polymer having a structure as represented by the following formula (1) at the terminal is formed.

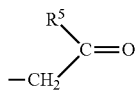

(1)

In the formula, $R^5$ represents a hydrogen atom or a methyl group. In the case where an isoprene unit has been cleaved, $R^1$ is methyl group in one cleaved terminal, and $R^5$ is a hydrogen atom in other cleaved terminal. In the case where a butadiene unit has been cleaved, $R^5$ is a hydrogen atom in both cleaved terminals. In more detail, the decomposed polymer has the structure as represented by the formula (1) in at least one terminal of the molecular chain. That is, a polymer having the group as represented by the formula (1) directly bonded to one end or both ends of a diene polymer chain is formed as shown in the following formulae (7) and (8).

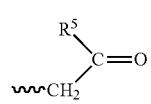

(7)

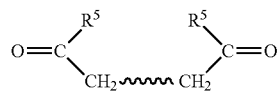

(8)

In the formulae (7) and (8), $R^5$ is a hydrogen atom or methyl group, and a portion shown by a wave line is a diene polymer chain. For example, in the case where natural rubber has been decomposed, the portion shown by a wave line is a polyisoprene chain comprising a repeating unit of an isoprene unit.

The molecular weight is reduced by decomposing the polymer by the oxidative cleavage. The number average molecular weight of the polymer after decomposition is not particularly limited, but is preferably from 300 to 500,000, more preferably 500 to 100,000, and still more preferably from 1,000 to 50,000. The amount of an alkoxysilyl group after recombination can be controlled by a size of a molecular weight after decomposition. However, where the molecular weight when decomposing is too small, a binding reaction is easy to occur in the same molecule.

After decomposing the polymer as above, the polymers decomposed are recombined with a reaction system containing a trifunctional molecule having an alkoxysilyl group as represented by the following formula (A) by changing the system into an acidic system when the system is basic and into a basic system when the system is acidic.

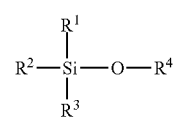

(A)

In the above formula (A), $R^1$, $R^2$ and $R^3$ each represent an aldehyde group or a carbonyl group, and $R^4$ represents an alkyl group having from 1 to 10 carbon atoms. Examples of the carbonyl group include carboxyl group, a keto group having an alkyl group having from 1 to 5 carbon atoms (—C(=O)R', carbon atoms of R': 1 to 5), and an ester group having an alkyl group having from 1 to 5 carbon atoms (—C(=O)OR", carbon atoms of R": 1 to 5).

The structure of the formula (1) shows two kinds of tautomerism, and is classified into a structure that bonds to the original carbon-carbon double bond structure and a structure that forms bonding structures as represented by the following formulae (2) to (5). In this embodiment, a polymer containing bonding structures of the formulae (2) to (5) can be formed by prioritizing an aldol condensation reaction by controlling pH of a reaction field. In detail, pH is sometimes controlled for stabilization in a reaction system, particularly in an aqueous emulsion solution, and the pH upon decomposition shifts to either of acidity or basicity depending on a method used for decomposition, or a kind or a concentration of a chemical used. For this reason, in the case where the reaction system upon decomposition is acidic, it is preferred that the reaction system is made basic, and in the case where the reaction system upon decomposition is basic, it is preferred that the reaction system is made acidic, such that a binding reaction that is a reverse reaction of cleavage preferentially proceeds.

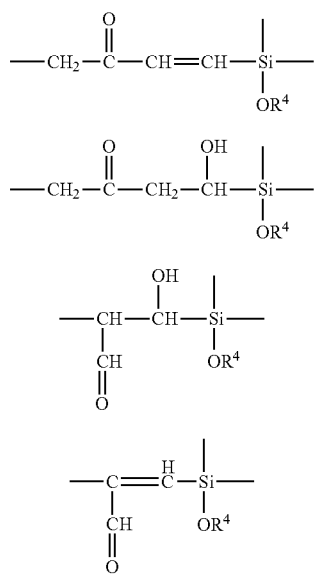

In the above formulae (2) to (5), $R^4$ represents an alkyl group having from 1 to 10 carbon atoms derived from $R^4$ in the formula (A). Carbon atoms derived from $R^1$, $R^2$ and $R^3$ are bonded to silicon atoms in those formulae, respectively, and those have the bonding structures as represented by the formulae (2) to (5). Three bonding structures as represented by the above formulae (2) to (5) bonded to one silicon atom may be mutually the same, and may be mutually different.

In the case where a polymer having a terminal structure wherein $R^5$ is a hydrogen atom is combined with the trifunctional group as represented by the formula (A) having an aldehyde group, a bonding structure as represented by the formula (4) is formed by an aldol condensation reaction, and water is eliminated from the bonding structure to form a bonding structure as represented by the formula (5). In the case where a polymer having a terminal structure wherein $R^5$ is a hydrogen atom is combined with the trifunctional molecule represented by the formula (A) having carbonyl group, a bonding structure as represented by the formula (3) is formed by an aldol condensation reaction, and water is eliminated from the bonding structure to form a bonding structure as represented by the formula (2).

When alkoxylsilyl groups are combined with each other, a bonding structure as represented by the following formula (6) is formed, but the amount of the bonding structure formed is small, and the bonding structures of the formulae (2) to (5) are mainly formed.

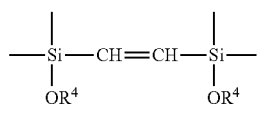

In the above formulae (6), $R^4$ represents an alkyl group having from 1 to 10 carbon atoms derived from $R^4$ in the formula (A).

There is a case that a bonding structure other than the formulae (2) to (6) is formed, for example, a case where a polymer having a terminal structure wherein $R^5$ is a methyl group is combined with the trifunctional molecule as represented by the formula (A) having carbonyl group. However, the amount of such a bonding structure is slight.

In conducting a binding reaction, an acid or base used for adjusting pH acts as a catalyst of the binding reaction, and, for example, pyrrolidine-2-carboxylic acid can be further used as a catalyst for adjusting the reaction.

After conducting the binding reaction as above, a modified polymer that is solid at ordinary temperature is obtained by coagulating and drying the aqueous emulsion.

According to this embodiment, by conducting the binding reaction as above, the bonding structures as represented by the above formulae (2) to (5) are introduced in a main chain, and a modified polymer having an alkoxysilyl group in a main chain is obtained. That is, the modified polymer according to the embodiment has a structure in which a linking group containing at least one of the bonding structures as represented by the formulae (2) to (5) is present in the molecule and diene polymer chains are directly linked through those linking groups.

The diene polymer chain used herein is a part of molecular chains of the diene polymer to be modified. For example, in the case of a homopolymer of a conjugated diene compound, when a constituting unit comprising the conjugated diene compound is $A^1$, the diene polymer chain is a repeating structure of $A^1$ as represented by $-(A^1)_n-$ (n is an integer of 1 or more, and is preferably from 10 to 10,000, and more preferably from 50 to 1,000). In the case of a bipolymer, when each of constituting units is $A^1$ and $A^2$ (at least one of $A^1$ and $A^2$ is a unit comprising a conjugated diene compound, and a unit other than this is, for example, a unit comprising the vinyl compound), the diene polymer chain is a repeating structure of $A^1$ and $A^2$ as represented by $-(A^1)_n-(A^2)_m-$ (those may be random form or block form, and n and m each are an integer of 1 or more, and are preferably from 10 to 10,000, and more preferably from 50 to 1,000). In the case of a terpolymer, when each of constituting units is $A^1$, $A^2$ and $A^3$ (at least one of $A^1$, $A^2$ and $A^3$ is a unit comprising a conjugated diene compound, and units other than this are, for example, a unit comprising the vinyl compound), the diene polymer chain is a repeating structure of $A^1$, $A^2$ and $A^3$ as represented by $-(A^1)_n-(A^2)_m-(A^3)_p-$ (those may be random form or block form, and n, m and p each are an integer of 1 or more, and are preferably from 10 to 10,000, and more preferably from 50 to 1,000). Tetrapolymer or more is the same.

In more detail, in the case of using natural rubber or synthetic isoprene rubber as a polymer to be modified, the diene polymer chain is a polyisoprene chain as represented by the following formula (9), constituted of a repeating structure of an isoprene unit. It is preferred that the diene polymer chain is a diene rubber polymer chain such as those polyisoprene chain and polybutadiene chain. In the formula (9), n is an integer of 1 or more, preferably from 10 to 10,000, and more preferably from 50 to 1,000.

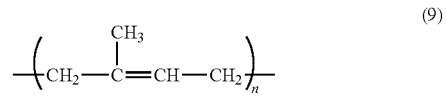

At least one of the bonding structures as represented by the formulae (2) to (5) is contained in one molecule of the modified polymer, and generally a plurality of bonding structures are contained in one molecule. In the case where a plurality of bonding structures are contained, a plurality of any one kind of the bonding structures as represented by the formulae (2) to (5) may be contained, and two or more kinds may be contained. The introduction rate of alkoxysilyl groups, that is, modification rate, is the total of contents of the bonding structures of the formulae (2) to (5), and is preferably from 0.1 to 20 mol %, more preferably from 0.5 to 10 mol %, and still more preferably from 1 to 5 mol %. Where the amount of alkoxysilyl groups introduced is too small, deterioration resistance improvement effect of rubber that is purposed in the present invention is not obtained, and on the other hand, where the amount is too large, crosslinking points become too large, and gelation may occur during the reaction. The content (modification rate) of the bonding structures is a ratio of mole number of the bonding structures to mole number of the whole constituting units constituting the modified polymer. For example, in the case of natural rubber, the content is a ratio of mole number of the bonding structures to the total of mole numbers of isoprene units of the modified polymer and the bonding structures.

For example, in the case of natural rubber and synthetic isoprene rubber (that is, in the case where the diene polymer chain has an isoprene unit), all of the bonding structures as represented by the formulae (2) to (5) are generally contained, but the bonding structure as represented by the formula (2) is mainly contained. In this case, the content of the bonding structure as represented by the formula (2) is preferably from 0.001 to 20 mol %, more preferably from 0.05 to 10 mol %, and still more preferably from 0.5 to 5 mol %.

The number average molecular weight of the modified polymer is preferably 60,000 or more, more preferably from 60,000 to 1,500,000, and particularly preferably from 100,000 to 1,200,000. Thus, it is preferred that the molecular weight of the modified polymer is set to a molecular weight equal to that of the original polymer by the recombination through the trifunctional molecule as described above. By this, the alkoxysilyl group can be introduced in a main chain of the polymer without decreasing the molecular weight, therefore while avoiding adverse influence to properties. Of course, a modified polymer having a molecular weight smaller than that of the original polymer may be obtained. The weight average molecular weight of the modified polymer is not particularly limited, but is preferably 70,000 or more, more preferably from 100,000 to 2,000,000, and most preferably from 300,000 to 1,700,000.

According to this embodiment, the double bond in the main chain is subjected to oxidative cleavage to decompose the polymer, thereby once decreasing the molecular weight. Thereafter, by changing acido-basic properties of a system containing the decomposed polymers and the trifunctional molecule having the alkoxysilyl group in the structure as represented by the following formula (A), the decomposed polymers are combined with the trifunctional molecule, thereby forming a modified polymer having the alkoxysilyl group introduced therein. Accordingly, the modified polymer can be converged to further uniform structure by monodispersion of the polymers. That is, the molecular weight distribution of the modified polymer can be smaller than the molecular weight distribution of the original polymer. This is considered that the shorter the polymer decomposed by oxidative cleavage, the higher the reactivity, and the easier the combination, and as a result, uniformity of molecular weight is conducted by decreasing the amount of short polymers.

Furthermore, according to this embodiment, a reaction for oxidative cleavage is controlled by adjusting a kind and amount of an oxidizing agent as a chemical for dissociating a double bond, a reaction time and the like, a binding reaction can be controlled by adjusting pH upon recombination, a catalyst, a reaction time and the like, and a molecular weight of the modified polymer can be controlled by those controls. For this reason, the number average molecular weight of the modified polymer can be set to a number average molecular weight equal to that of the original polymer, and further can be set to a number molecular weight lower than that of the original polymer.

In decomposing the polymer main chain and recombining them, the above bonding structure is inserted as a structure different from the main chain, and a binding point of segments of the main chain structure becomes functional. That is, a structure having high reactivity is introduced in a molecular main chain, and properties of the original polymer can be changed. Thus, the method of this embodiment is not grafting, direction addition and ring opening, but is to change a main chain structure itself of a polymer, apparently differs from the conventional modification method, and can simply and easily introduce an alkoxysilyl group in a main chain structure. Furthermore, to natural polymer such as natural rubber, a modified polymer having a novel structure can be produced by rearranging its main chain structure, and properties of the polymer can be changed.

Next, the second embodiment of the production method of the present invention is described. In the second embodiment, an alkoxysilyl group is introduced in a molecular terminal of a polymer.

As the polymer to be modified in the production method of this embodiment, the polymers described in the first embodiment are used, and preferred examples are the same. Furthermore, preferable use of an aqueous emulsion as the polymer to be modified, preferable concentration, and the like are also the same. Additionally, an oxidizing agent usable for oxidative cleavage of a carbon-carbon double bond of a polymer, a metal type oxidation catalyst, oxidation conditions, and the like are the same.

The polymer is decomposed by the oxidative cleavage, and polymers having a carbonyl group (>C=O) and an aldehyde group (—CHO) at the terminal are obtained. For example, in the case where the polymer to be modified has an isoprene unit or a butadiene unit, a polymer having a structure as represented by the following formula (11) at the terminal is formed.

(11)

In the formula (11), $R^9$ represents hydrogen atom or methyl group, and in the case where the isoprene unit has cleaved, $R^9$ is methyl group in one cleaved terminal, and $R^9$ is hydrogen atom in other cleaved terminal; and in the case where the butadiene unit has cleaved, $R^9$ is hydrogen atom in the both cleaved terminals. In more detail, the decomposed polymer has the structure as represented by the formula (11) in at least one terminal of the molecular chain, that is, a polymer having the group as represented by the formula (11) directly bonded to one terminal or both terminals of the diene polymer chain is formed as shown in the following formulae (17) and (18).

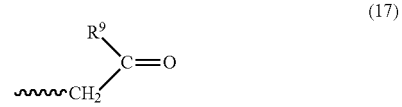

(17)

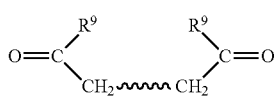
(18)

In the formulae (17) and (18), $R^9$ is a hydrogen atom or methyl group, and a portion shown by a wave line is a diene polymer chain. For example, in the case where natural rubber has been decomposed, the portion shown by a wave line is a polyisoprene chain comprising a repeating structure of an isoprene unit.

The molecular weight is reduced by decomposing a polymer by the oxidative cleavage. The number average molecular weight of the polymer after decomposition is not particularly limited, but is preferably from 300 to 500,000, more preferably 500 to 100,000, and still more preferably from 1,000 to 50,000. The amount of an alkoxysilyl group after recombination can be controlled by a size of a molecular weight after decomposition. However, where the molecular weight upon decomposition is too small, a binding reaction is easy to occur in the same molecule.

After decomposing the polymer as above, the polymers decomposed are recombined in a reaction system containing a functional molecule having the alkoxysilyl group as represented by the following formula (a) by changing the system into an acidic system when the system is basic and into a basic system when the system is acidic.

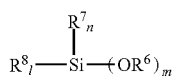
(a)

In the formula (a), $R^6$ represents an alkyl group having from 1 to 10 carbon atoms, $R^7$ represents an aldehyde group or a carbonyl group, $R^8$ represents an alkyl group having from 1 to 10 carbon atoms, m represents a number of from 1 to 3, n represents a number of 1 or 2, and l represents a number of from 0 to 2. The total of m, n and l is 4. Examples of the carbonyl group include a carboxyl group, a keto group having an alkyl group having from 1 to 5 carbon atoms (—C(=O)R', carbon atoms of R': 1 to 5), and an ester group having an alkyl group having from 1 to 5 carbon atoms (—C(=O)OR", carbon atoms of R": 1 to 5).

The functional molecule having the alkoxysilyl group in the structure as represented by the formula (a) can be obtained by oxidative cleavage of a carbon-carbon double bond of a functional molecule having at least one vinyl group. The oxidative cleavage reaction can be conducted according to the oxidative cleavage reaction of the polymer, and can be conducted simultaneously with the oxidative cleavage reaction of the polymer. Preferred specific examples of the functional molecule having at least one vinyl group include vinyltrimethoxysilane, vinyltriethoxysilane, dimethoxymethylvinylsilane, diethoxymethylvinylsilane, dimethoxyethylvinylsilane, diethoxyethylvinylsilane, methoxydimethylvinylsilane, ethoxydimethylvinylsilane, methoxydiethylvinylsilane, ethoxydiethylvinylsilane, diethoxypropylvinylsilane, dimethoxypropylvinylsilane, methoxydipropylvinylsilane, ethoxydipropylvinylsilane, dimethoxydivilylsilane, diethoxydivinylsilane, methoxymethyldivinylsilane, ethoxyethyldivinylsilane, methoxyethyldivinylsilane, ethoxymethyldivinylsilane, methoxypropyldivinylsilane, ethoxypropyldivinylsilane, trivinylmethoxysilane, trivinylethoxysilane, trivinylpropoxysilane and vinyltris(2-methoxyethoxy)silane.

The structure of the formula (11) shows two kinds of tautomerism, and is classified into a structure that bonds to the original carbon-carbon double bond structure and a structure that forms bonding structures as represented by the following formulae (12) to (15). In this embodiment, a polymer containing the bonding structures as represented by the formulae (12) to (15) can be formed by prioritizing an aldol condensation reaction by controlling pH of a reaction field. In detail, pH is sometimes controlled for stabilization in a reaction system, particularly in an aqueous emulsion solution, and the pH upon decomposition shifts to either of acidity or basicity depending on a method used for deposition or a kind or a concentration of a chemical used. For this reason, in the case where the reaction system upon decomposition is acidic, it is preferred that the reaction system is made basic, and in the case where the reaction system upon decomposition is basic, it is preferred that the reaction system is made acidic, such that a binding reaction that is a reverse reaction of cleavage preferentially proceeds.

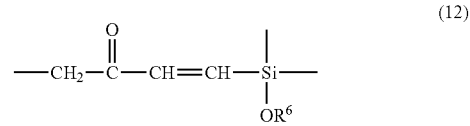
(12)

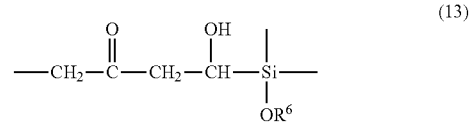
(13)

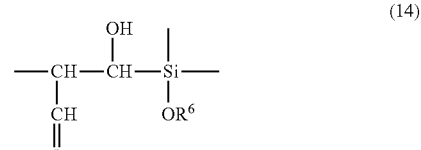
(14)

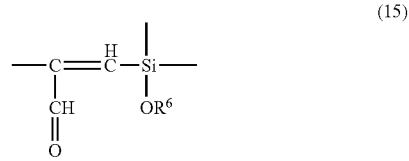
(15)

In the formulae (12) to (15), $R^6$ represents an alkyl group having from 1 to 10 carbon atoms derived from $R^6$ in the formula (a). When n in the formula (a) is 1, the bonding structures as represented by the formulae (12) to (15) are formed in only the molecular terminals, and of those, the bonding structure as represented by the formula (12) forms specifically a terminal group as represented by the following formula (b). When n in the formula (a) is 2, the bonding structure as represented by those formulae (12) to (15) are formed in molecular terminals and are also formed in a main chain.

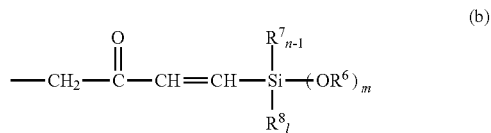
(b)

In the formula (b), $R^6$, $R^7$, $R^8$, m, n and l are the same as $R^6$, $R^7$, $R^8$, m, n and l in the formula (a), respectively.

In the case where the polymer having a terminal group wherein $R^9$ is hydrogen atom is combined with the functional molecule as represented by the formula (A) having aldehyde group, the bonding structure as represented by the formula (14) is formed by an aldol condensation reaction, and water is eliminated from the bonding structure to form a bonding structure as represented by the formula (15). In the case where a polymer having a terminal structure wherein $R^9$ is hydrogen atom is combined with the functional molecule represented by the formula (a) having carbonyl group, the bonding structure as represented by the formula (13) is formed by an aldol condensation reaction, and water is eliminated from the bonding structure to form the bonding structure as represented by the formula (12).

When alkoxysilyl groups are combined with each other, a bonding structure as represented by the following formula (16) is formed, but the amount of the bonding structure formed is small, and the bonding structures of the formulae (12) to (15) are mainly formed.

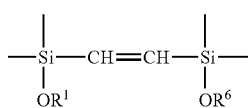

(16)

In the formula (16), $R^6$ represents an alkyl group having from 1 to 10 carbon atoms derived from the formula (a).

There is a case that a bonding structure other than the formulae (12) to (16) is formed, for example, a case that a polymer having a terminal structure wherein $R^9$ is methyl group is combined with a functional molecule as represented by the formula (a) having carbonyl group. However, the amount of such a bonding structure is slight.

In conducting a binding reaction, an acid or base used for adjusting pH acts as a catalyst of the binding reaction, and, for example, pyrrolidine-2-carboxylic acid can be further used as a catalyst for adjusting the reaction.

After conducting the binding reaction as above, a modified polymer that is solid at ordinary temperature is obtained by coagulating and drying the aqueous emulsion.

According to this embodiment, by conducting the binding reaction as above, a modified polymer having at least one of bonding structures as represented by the above formulae (12) to (15) is obtained. That is, the modified polymer according to the embodiment has a structure in which at least one of the bonding structures as represented by the formulae (12) to (15) is present in the molecule, particularly the terminal group as represented by the formula (b) is present in at least one molecular terminal, and diene polymer chains are directly linked through the linking group.

The diene polymer chain used herein is a part of molecular chains of the diene polymer to be modified. For example, in the case of a homopolymer of a conjugated diene compound, when a constituting unit comprising the conjugated diene compound is $A^1$, the diene polymer chain is a repeating structure of $A^1$ as represented by $-(A^1)_n-$ (n is an integer of 1 or more, and is preferably from 10 to 10,000, and more preferably from 50 to 1,000). In the case of a bipolymer, when each of constituting units is $A^1$ and $A^2$ (at least one of $A^1$ and $A^2$ is a unit comprising a conjugated diene compound, and a unit other than this is, for example, a unit comprising the vinyl compound), the diene polymer chain is a repeating structure of $A^1$ and $A^2$ as represented by $-(A^1)_n-(A^2)_m-$ (those may be random form or block form, and n and m each are an integer of 1 or more, and are preferably from 10 to 10,000, and more preferably from 50 to 1,000). In the case of a terpolymer, when each of constituting units is $A^1$, $A^2$ and $A^3$ (at least one of $A^1$, $A^2$ and $A^3$ is a unit comprising a conjugated diene compound, and units other than this are, for example, a unit comprising the vinyl compound), the diene polymer chain is a repeating structure of $A^1$, $A^2$ and $A^3$ as represented by $-(A^1)_n-(A^2)_m-(A^3)_p-$ (those may be random form or block form, and n, m and p each are an integer of 1 or more, and are preferably from 10 to 10,000, and more preferably from 50 to 1,000). Tetrapolymer or more is the same.

More specifically, in the case of using natural rubber or synthetic isoprene rubber as a polymer to be modified, the diene polymer chain is a polyisoprene chain as represented by the following formula (19), constituted of a repeating structure of an isoprene unit. It is preferred that the diene polymer chain is a diene rubber polymer chain such as those polyisoprene chain and polybutadiene chain. In the formula (19), s is an integer of 1 or more, preferably from 10 to 10,000, and more preferably from 50 to 1,000.

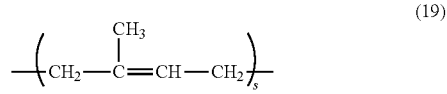

(19)

At least one of the bonding structures as represented by the formulae (12) to (15) is contained in one molecule of the modified polymer, and generally a plurality of bonding structures are contained in one molecule. In the case where a plurality of bonding structures are contained, a plurality of any one kind of the bonding structures as represented by the formulae (12) to (15) may be contained, and two or more kinds may be contained. The introduction rate of alkoxysilyl groups, that is, modification rate, is the total of contents of the bonding structures of the formulae (12) to (15), and is preferably from 0.001 to 10 mol %, more preferably from 0.005 to 8 mol %, and still more preferably from 0.01 to 5 mol %, in terms of the whole molecules including the terminal groups. Where the introduction amount of alkoxysilyl groups is too small, the effect purposed in the present invention is difficult to be obtained, and on the other hand, where the amount is too large, bonding of the terminal is disturbed, and deterioration of tensile properties caused by the decrease of a molecular weight may occur. The content (modification rate) of the bonding structure is a ratio of mole number of the bonding structure to mole number of the whole constituting units constituting the modified polymer. For example, in the case of natural rubber, the content is a ratio of mole number of the bonding structure to the total of mole number the whole isoprene units of the modified polymer and mole number of the bonding structure.

For example, in the case of natural rubber and synthetic isoprene rubber (that is, in the case where the diene polymer chain has an isoprene unit), all of the bonding structures as represented by the formulae (12) to (15) are generally contained, but the bonding structure as represented by the formula (12) is mainly contained. In this case, the content of the bonding structure as represented by the formula (12) is preferably from 0.001 to 5 mol %, more preferably from 0.005 to 5 mol %, and still more preferably from 0.01 to 1 mol %.

The number average molecular weight of the modified polymer is preferably 60,000 or more, more preferably from 60,000 to 1,000,000, still more preferably from 80,000 to 800,000, and particularly preferably from 100,000 to 500,000. Thus, it is preferred that the molecular weight of the modified polymer is set to a molecular weight equal to that of the original polymer by the recombination through the functional molecule as described above. By this, the alkoxysilyl group can be introduced in the terminals of the polymer without decreasing the molecular weight, therefore while avoiding adverse influence to properties. Of course, a modified polymer having a molecular weight smaller than that of the original polymer may be obtained. The weight average molecular weight of the modified polymer is not particularly limited, but is preferably 70,000 or more, more preferably from 100,000 to 1,700,000, and particularly preferably from 300,000 to 1,500,000.

According to this embodiment, the double bond in the main chain is subjected to oxidative cleavage to decompose the polymer, thereby once decreasing the molecular weight. Thereafter, the decomposed polymers and the functional molecule are combined by changing acido-basic properties of a system containing the decomposed polymers and the functional molecule having the alkoxysilyl group in the structure as represented by the following formula (a), thereby forming a modified structure having the alkoxysilyl group introduced in at least the molecular terminal. Accordingly, the modified polymer can be converged to further uniform structure by monodispersion of the polymers. That is, molecular weight distribution of the modified polymer can be smaller than molecular weight distribution of the original polymer. This is considered that the shorter the polymer decomposed by oxidative cleavage, the higher the reactivity, and the easier the combination, and as a result, uniformity of molecular weight is conducted by decreasing the amount of short polymers.

Furthermore, according to this embodiment, a reaction for conducting oxidative cleavage is controlled by adjusting a kind and amount of an oxidizing agent as a chemical for dissociating a double bond, a reaction time and the like, a binding reaction can be controlled by adjusting pH upon recombination a catalyst, a reaction time and the like, and a molecular weight of the modified polymer can be controlled by those controls. For this reason, a number average molecular weight of the modified polymer can be set to be equal to that of the original polymer, and can be set to a number molecular weight lower than that of the original polymer.

The modified polymers obtained by the production methods of the first and second embodiments can be used as a polymer component in various polymer compositions, and the use thereof is not particularly limited. However, it is preferred to obtain a modified diene rubber obtained by modifying a diene rubber and use the modified diene rubber as a rubber component in various rubber compositions. In the case of using in a rubber composition, the rubber component may be the modified diene rubber alone, and the modified diene rubber may be used as a blend with other diene rubber.

Depending on the use purpose, a filler such as silica or carbon black can be added to the rubber composition together with the rubber component, and various additives generally used in a rubber composition, such as a softener, a plasticizer, an age resister, zinc flower, stearic acid, a vulcanizing agent or a vulcanization accelerator, can be added to the rubber composition. The use of the rubber composition is not particularly limited, and can be used in various rubber members for a tire, an antivibration rubber, a conveyer belt or the like.

A rubber composition for a tire using the modified diene rubber component of the present invention is described below.

In a first embodiment, the rubber composition for a tire of the present invention is that diene polymer chains are linked through linking groups containing at least one of the bonding structures as represented by the formulae (2) to (5), the modified diene rubber polymer having from 1 to 5 mol % of an alkoxysilyl group introduced in the main chain is used as a rubber component, and a filler is added to this.

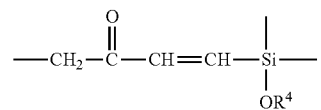

(2)

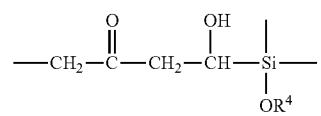

(3)

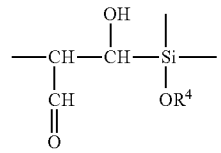

(4)

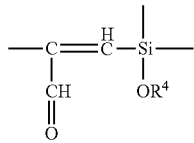

(5)

In the formulae (2) to (5), $R^4$ represents an alkyl group having from 1 to 10 carbon atoms.

It is preferred that the modified diene rubber polymer is a modified isoprene rubber having the polyisoprene chains as represented by the formula (9) linked through the above linking groups.

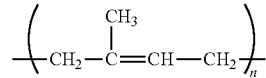

(9)

In the formula (9), n is an integer of 1 or more.

In a second embodiment, the rubber composition for a tire of the present invention is that a diene rubber polymer having the terminal group as represented by the formula (b) in at least one molecular terminal, having from 0.01 to 5 mol % of an alkoxysilyl group introduced therein is used as a rubber component, and a filler is added thereto.

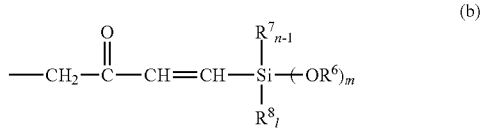

(b)

In the formula (b), $R^6$ represents an alkyl group having from 1 to 10 carbon atoms, $R^7$ represents an alkyl group, an aldehyde group or a carbonyl group, $R^8$ represents an alkyl group having from 1 to 10 carbon atoms, m is a number of from 1 to 3, n is a number of 1 or 2, and l is a number of from 0 to 2. The total of m, n and l is 4.

It is preferred that the modified diene rubber is a modified isoprene rubber having isoprene chains as represented by the following formula (19) linked through the bonding structure as represented by any of the following formulae (12) to (15).

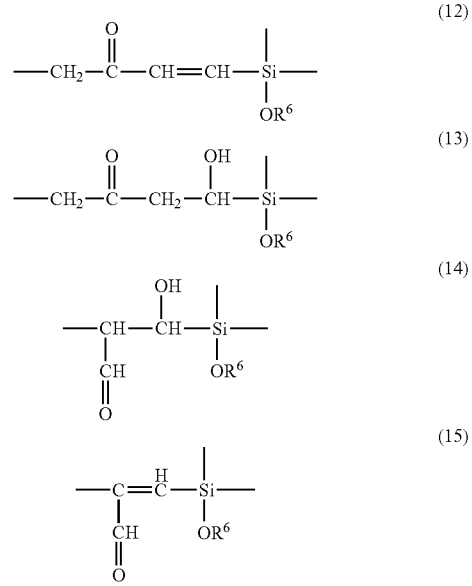

In the formulae (12) to (15), $R^6$ represents an alkyl group having from 1 to 10 carbon atoms.

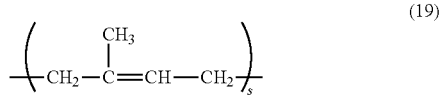

In the formula (19), s is an integer of 1 or more.

In any of the above embodiments, the amount of the filler added in the rubber composition is preferably from 5 to 150 parts by mass, and more preferably from 20 to 60 parts by mass, per 100 parts by mass of the modified diene rubber component from the standpoints of balance of strength and other properties of a rubber.

The filler contains silica in an amount of preferably from 5 to 80 parts by mass, and more preferably from 30 to 60 parts by mass, per 100 parts by mass of the diene rubber component.

The silica is not particularly limited, and examples thereof include wet silica (hydrous silicic acid) and dry silica (anhydrous silicic acid). Wet silica is preferred due to the large amount of a silanol group. Nitrogen adsorption specific surface area ($N_2SA$) of the silica is preferably a range of from 120 to 240 $m^2/g$.

The filler preferably contains carbon black in an amount of from 5 to 80 parts by mass, and more preferably in an amount of from 10 to 50 parts by mass, per 100 parts by mass of the diene rubber. However, when silica and carbon are used together, the total amount is preferably 150 parts by mass or less as described above.

The carbon black is not particularly limited, and the conventional various kinds can be used. For example, carbon blacks of SAF grade (N100 Series), ISAF grade (N200 Series), HAF grade (N300 Series), FEF grade (N500 Series) and GPF grade (N600 Series) (all is ASTM grade) are preferably used.

In addition to the components described above, various additives generally used in a rubber composition, such as an oil, zinc flower, stearic acid, a vulcanizing agent or a vulcanization accelerator, can be added to the rubber composition according to this embodiment. Rubber components other than the modified diene rubber can be added in an amount of a range that is not contrary to the gist of the present invention. Examples of the vulcanizing agent include sulfur components such as powdered sulfur, precipitated sulfur, colloidal sulfur, insoluble sulfur and highly dispersive sulfur. Although not particularly limited, the amount of the vulcanizing agent added is preferably from 0.1 to 10 parts by mass, more preferably from 0.5 to 5 parts by mass, and still more preferably from 1 to 3 parts by mass, per 100 parts by mass of the diene rubber. The amount of the vulcanization accelerator added is preferably from 0.1 to 7 parts by mass, and more preferably from 0.5 to 5 parts by mass, per 100 parts by mass of the diene rubber.

The rubber composition can be prepared by kneading according to the conventional method using a mixing machine generally used such as Banbury mixer, kneader or rolls. That is, a rubber composition can be prepared by adding other compounding ingredients excluding a vulcanizing agent and a vulcanization accelerator to a diene rubber, followed by kneading, in a first mixing stage, and then adding a vulcanizing agent and a vulcanization accelerator to the mixture obtained, followed by kneading, in a final mixing stage.

A tread rubber can be formed by vulcanization molding the rubber composition according to the present embodiment into a desired shape at, for example, from 140 to 180° C., according to the conventional method, and a pneumatic tire can be formed using the tread rubber according to the conventional method.

EXAMPLES

Examples of the present invention are described below, but the present invention is not construed as being limited to those examples. Unless otherwise indicated, "parts", "%" and the like are mass basis such as "parts by mass" or "mass %". The following methods were used for the measurement of pH, molecular weight and bonding structure content.
[pH]
pH was measured using a portable pH meter "HM-30P" manufactured by DKK-Toa Corporation.
[Number Average Molecular Weight (Mn), Weight Average Molecular Weight (Mw) and Molecular Weight Distribution (Mw/Mn)]
Mn, Mw and Mw/Mn in terms of polystyrene were obtained by the measurement with gel permeation chromatography (GPC). In detail, 0.2 mg of a sample dissolved in 1 mL of THF was used as a measurement sample. Using "LC-20DA" manufactured by Shimadzu Corporation, the sample was passed through a filter and then passed through a column ("PL Gel 3 μm Guard"×2 manufactured by Polymer Laboratories) at a temperature of 40° C. in a flow rate of 0.7 mL/min, and detected with "RI Detector" manufactured by Spectra System.

[Bonding Structure Content]

Contents of the bonding structures (2) to (5) or (12) to (15) were measured by NMR. NMR spectrum was measured with "400 ULTRASHIELD™ PLUS" manufactured by BRUKER. 1 g of a polymer was dissolved in 5 mL of deuterated chloroform, and 87 mg of acetyl acetone chromium salt was added as a relaxation reagent, followed by measurement with NMR 10 mm tube.

Regarding the bonding structure of the formula (2) or (12), a peak of carbon adjacent to silicon is present at 130 ppm in $^{13}$C-NMR. Regarding the bonding structure of the formula (3) or (13), a peak of carbon adjacent to silicon is present at 55 ppm in adjacent to silicon is present at 204 ppm in $^{13}$C-NMR. Regarding the bonding structure of the formula (5) or (15), a peak of carbon adjacent to silicon is present at 132 ppm in $^{13}$C-NMR. Therefore, regarding each peak, the amount of structure (mole number) was determined by a ratio to a base polymer component.

The mole number of each unit in the base polymer component was calculated based on a peak of carbon opposite a methyl group across a double bond and hydrogen bonded thereto (=CH—), that is, a peak at 122 ppm by $^{13}$C-NMR, in an isoprene unit. In each structure unit as represented by the formulae (2) to (5), as the respective peaks of three carbons adjacent to silyl group are detected, ⅓ (one third) of the amount derived from those peaks was regarded as each bonding structure content (mol %), and the total amount of each bonding structure content of the formulae (2) to (5) was shown as the content of alkoxysilyl groups. Furthermore, in each structure unit as represented by the formulae (12) to (15), the amount derived from a peak of carbon with a double bond or hydroxyl group adjacent to silyl group was regarded as each bonding structure content (mol %), and the total amount of those bonding structure contents was shown as the alkoxysilyl group content.

1. Modified Polymer Having Alkoxysilyl Group Introduced in Main Chain

Example 1: Synthesis of Modified Polymer A

Natural rubber latex (high ammonia-containing natural rubber "HA-NR" manufactured by Regitex Co., Ltd., DRC (Dry Rubber Content)=60 mass %) was used as a polymer to be modified. Molecular weight of an unmodified natural rubber contained in the natural rubber latex was measured. As a result, the weight average molecular weight was 2,020,000, the number average molecular weight was 510,000, and the molecular weight distribution was 4.0.

1.65 g of periodic acid ($H_5IO_6$) was added to 100 g of a polymer mass in the natural rubber latex having been adjusted to DRC 30 mass %, followed by stirring at 23° C. for 3 hours. By adding periodic acid to a polymer in an emulsion state and then stirring as above, a double bond in a polymer chain was oxidatively decomposed, and a polymer containing the structure as represented by the formula (1) was obtained. The decomposed polymer obtained had the weight average molecular weight of 13,500, the number average molecular weight of 5,300 and the molecular weight distribution of 2.6, and pH of a reaction liquid after decomposition was 6.2.

A reaction product obtained by adding 0.01 g of periodic acid ($H_5IO_6$) to 3.9 g of trivinylethoxysilane, followed by stirring at 23° C. for 1 hour, and 0.1 g of pyrrolidine-2-carboxylic acid as a catalyst were added to the decomposed polymer, and 1N sodium hydroxide was added such that pH of the reaction liquid is 10, followed by stirring at 23° C. for 24 hours to conduct a reaction. The reaction mixture was precipitated in methanol. The precipitate was washed with water, and dried at 30° C. for 24 hours by a hot air circulating drier. Thus, modified polymer A that is solid at ordinary temperature was obtained.

Sodium hydroxide was added to the reaction system thus oxidatively decomposed to forcibly change the reaction system into a basic system, thereby recombination reaction could be preferentially conducted while neutralizing the effect of periodic acid added when conducting oxidative cleavage. As a result, modified natural rubber (modified polymer A) containing the bonding structures as represented by the formulae (2) to (5) was obtained. Pyrrolidine-2-carboxylic acid was used as a catalyst, but this was to accelerate a reaction, and the reaction proceeds without the catalyst.

The modified polymer A obtained had the weight average molecular weight Mw of 1,520,000, the number average molecular weight Mn of 620,000, the molecular weight distribution Mw/Mn of 2.5, and the content of the bonding structure of 1.0 mol % for the formula (2), 0.1 mol % for the formula (3), 0.1 mol % for the formula (4) and 0.3 mol % for the formula (5), the total being 1.5 mol %, as shown in Table 1 below. Thus, the modified polymer A had the number average molecular weight nearly equal to that of the unmodified natural rubber. Furthermore, the molecular weight distribution was smaller than that of the unmodified natural rubber, and uniformity was excellent.

Examples 2 and 3: Synthesis of Modified Polymers B and C

Solid modified polymers B and C were synthesized in the same manner as in Example 1, except for changing the reaction time in oxidative decomposition, the amount of periodic acid added, a pH regulator added and pH in a recombination reaction, and the amount of a catalyst, as shown in Table 1 below. Mw, Mn, Mw/Mn and the content of each bonding structure of the modified polymers B and C obtained are shown in Table 1. In the modified polymers B and C, the bonding structure having an alkoxysilyl group was introduced in the main chain, the molecular weight distribution was smaller than that of the unmodified natural rubber, and uniformity was excellent. Furthermore, the molecular weight could be controlled by changing the above conditions.

Comparative Example 1 in Table 1 is an unmodified natural rubber obtained by directly coagulating and drying the natural rubber latex (high ammonia-containing natural rubber "HA-NR" manufactured by Regitex Co., Ltd., DRC=60 mass %) without modification. Furthermore, Comparative Example 2 is a decomposed polymer obtained by subjecting the same natural rubber to only oxidative cleavage, followed by coagulating and drying.

TABLE 1

| | | Polymer before modification | | | Oxidative decomposition reaction condition | | | Polymer after decomposition | | | | Trivinyl ethoxy silane (g) |
|---|---|---|---|---|---|---|---|---|---|---|---|---|
| | | Mw (×10⁵) | Mn (×10⁵) | Mw/Mn | Temp. (°C.) | Amount of periodic acid(g) | Reaction time | Mw (×10³) | Mn (×10³) | Mw/Mn | pH | |
| Comparative Example 1 | Unmodified NR | 20.2 | 5.1 | 4.0 | — | — | — | — | — | — | — | — |
| Comparative Example 2 | Decomposed polymer | 20.2 | 5.1 | 4.0 | 23 | 0.3 | 1 h | 15.4 (×10⁵) | 4.3 (×10⁵) | 3.6 | 8.0 | — |
| Example 1 | Modified polymer A | 20.2 | 5.1 | 4.0 | 23 | 1.65 | 3 h | 13.5 | 5.3 | 2.6 | 6.2 | 3.9 |
| Example 2 | Modified polymer B | 20.2 | 5.1 | 4.0 | 23 | 1.65 | 3 h | 13.5 | 5.3 | 2.6 | 6.2 | 5.2 |
| Example 3 | Modified polymer C | 20.2 | 5.1 | 4.0 | 23 | 1.65 | 3 h | 13.5 | 5.3 | 2.6 | 6.2 | 6.5 |

| | Condensation reaction condition | | | | | Modified polymer | | | Linking structure content (mol %) | | | | Alkoxy silyl group content |
|---|---|---|---|---|---|---|---|---|---|---|---|---|---|
| | Temp. (°C.) | Amount of pyrrolidine-2-carboxylic acid (g) | pH regulator | Reaction time | pH | Mw (×10⁵) | Mn (×10⁵) | Mw/Mn | Formula (1) | (2) | (3) | (4) | |
| Comparative Example 1 | — | — | — | — | — | — | — | — | 0 | 0 | 0 | 0 | 0 |
| Comparative Example 2 | — | — | — | — | — | — | — | — | 0 | 0 | 0 | 0 | 0 |
| Example 1 | 23 | 0.1 | Sodium hydroxide | 24 h | 8.0 | 15.2 | 6.2 | 2.5 | 1.0 | 0.1 | 0.1 | 0.3 | 1.5 |
| Example 2 | 23 | 0.1 | Sodium hydroxide | 24 h | 8.0 | 15.5 | 8.1 | 1.9 | 1.3 | 0.1 | 0.1 | 0.4 | 1.9 |
| Example 3 | 23 | 0.1 | Sodium hydroxide | 24 h | 8.0 | 15.6 | 10.1 | 1.5 | 1.8 | 0.2 | 0.1 | 0.5 | 2.6 |

2. Modified Polymer Having Alkoxysilyl Group Introduced in Molecular Terminal

Example 4: Synthesis of Modified Polymer D

Natural rubber latex ("HA-NR" manufactured by Regitex Co., Ltd., DRC (Dry Rubber Content)=60 mass %) was used as a polymer to be modified. Molecular weight of an unmodified natural rubber contained in the natural rubber latex was measured. As a result, the weight average molecular weight was 2,020,000, the number average molecular weight was 510,000, and the molecular weight distribution was 4.0.

1.65 g of periodic acid ($H_5IO_6$) was added to 100 g of a polymer mass in the natural rubber latex having been adjusted to DRC 30 mass %, followed by stirring at 23° C. for 3 hours. By adding periodic acid to a polymer in an emulsion state and then stirring, a double bond in a polymer chain was oxidatively decomposed, and a polymer containing the structure as represented by the formula (11) was obtained. The decomposed polymer obtained had the weight average molecular weight of 13,500, the number average molecular weight of 5,300 and the molecular weight distribution of 2.6, and pH of a reaction liquid after decomposition was 6.2.

A reaction product obtained by adding 0.001 g of periodic acid ($H_5IO_6$) to 0.03 g of vinyltrimethoxysilane, followed by stirring at 23° C. for 0.5 hour and 0.1 g of pyrrolidine-2-carboxylic acid as a catalyst were added to the decomposed polymer, 1N sodium hydroxide was added such that pH of the reaction liquid is 10, followed by stirring at 23° C. for 24 hours to conduct a reaction. The reaction mixture was precipitated in methanol. The precipitate was washed with water, and dried at 30° C. for 24 hours by a hot air circulating drier. Thus, modified polymer D that is solid at ordinary temperature was obtained.

Sodium hydroxide was thus added to the reaction system oxidatively decomposed to forcibly change the reaction system into a basic system, thereby a recombination reaction could be preferentially conducted while neutralizing the effect of periodic acid added when conducting oxidative cleavage. As a result, modified natural rubber (modified polymer D) containing the bonding structures as represented by the formulae (12) to (15) was obtained. Pyrrolidine-2-carboxylic acid was used as a catalyst, but this was to accelerate a reaction, and the reaction proceeds without the catalyst.

The modified polymer D obtained had the weight average molecular weight Mw of 1,480,000, the number average molecular weight Mn of 470,000, the molecular weight distribution Mw/Mn of 3.1, and the content of the bonding structure of 0.010 mol % for the formula (12), 0.002 mol % for the formula (13), 0.001 mol % for the formula (14) and 0.004 mol % for the formula (15), the total being 0.017 mol %, as shown in Table 2 below.

Examples 5 and 6: Synthesis of Modified Polymers E and F

Solid modified polymers E and F were synthesized in the same manner as in Example 1, except for changing the reaction time in oxidative decomposition, the amount of periodic acid added, a pH regulator added and pH in a recombination reaction, and the amount of a catalyst as shown in Table 2 below. Mw, Mn, Mw/Mn and the content of each bonding structure of the modified polymers E and F obtained are shown in Table 2. In the modified polymers E and F, the bonding structure having an alkoxysilyl group was introduced in the main chain, the molecular weight distribution was smaller than that of the unmodified natural rubber, and uniformity was excellent. Furthermore, the molecular weight could be controlled by changing the above conditions.

Comparative Example 3 in Table 2 is an unmodified natural rubber obtained by directly coagulating and drying the natural rubber latex ("HA-NR" manufactured by Regitex Co., Ltd., DRC=60 mass %) without modification.

Furthermore, Comparative Example 4 is a decomposed polymer obtained by subjecting the same natural rubber to only the oxidative cleavage, followed by coagulating and drying.

a final mixing stage. The detail of each component in Table 3, other than a rubber component, is as follows.

Silica: "NIPSIL AQ" manufactured by Tosoh Silica Corporation Carbon black: "SEAST 3" manufactured by Tokai Carbon Co., Ltd.

Silane coupling agent: Bis-(3-triethoxysilylpropyl)tetrasulfide, "Si69" manufactured by EVONIK DEGUSSA Zinc flower: "Zinc Flower Grade 1" manufactured by Mitsui Mining & Smelting Co., Ltd.

Age resister: "NOCRAC 6C" manufactured by Ouchi Shinko Chemical Industrial Co., Ltd.

Stearic acid: "LUNAC S-20" manufactured by Kao Corporation Process oil: "X-140" manufactured by JX Nippon Oil & Energy Corporation Sulfur: "Powdered sulfur for rubber 150 mesh" manufactured by Hosoi Chemical Industry Co., Ltd.

TABLE 2

| | | Polymer before modification | | | Oxidative decomposition reaction condition | | | Polymer after decomposition | | | | Vinyl trimethoxy silane (g) |
|---|---|---|---|---|---|---|---|---|---|---|---|---|
| | | Mw ($\times 10^5$) | Mn ($\times 10^5$) | Mw/Mn | Temp. (° C.) | Amount of periodic acid(g) | Reaction time | Mw ($\times 10^3$) | Mn ($\times 10^3$) | Mw/Mn | pH | |
| Comparative Example 3 | Unmodified NR | 20.2 | 5.1 | 4.0 | — | — | — | — | — | — | — | — |
| Comparative Example 4 | Decomposed polymer | 20.2 | 5.1 | 4.0 | 23 | 0.3 | 1 h | 15.4 ($\times 10^5$) | 14.3 ($\times 10^5$) | 3.6 | 8.0 | — |
| Example 4 | Modified polymer D | 20.2 | 5.1 | 4.0 | 23 | 1.65 | 3 h | 13.5 | 5.3 | 2.6 | 6.2 | 0.03 |
| Example 5 | Modified polymer E | 20.2 | 5.1 | 4.0 | 23 | 1.65 | 3 h | 13.5 | 5.3 | 2.6 | 6.2 | 0.10 |
| Example 6 | Modified polymer F | 20.2 | 5.1 | 4.0 | 23 | 1.65 | 3 h | 13.5 | 5.3 | 2.6 | 6.2 | 0.30 |

| | Condensation reaction condition | | | | | Modified polymer | | | Linking structure content (mol %) | | | | Alkoxy silyl group content ($\times 10^{-2}$) |
|---|---|---|---|---|---|---|---|---|---|---|---|---|---|
| | Temp. (° C.) | Amount of pyrrolidine-2-carboxylic acid (g) | pH regulator | Reaction time | pH | Mw ($\times 10^5$) | Mn ($\times 10^5$) | Mw/Mn | Formula (12) ($\times 10^{-2}$) | (13) ($\times 10^{-2}$) | (14) ($\times 10^{-2}$) | (15) ($\times 10^{-2}$) | |
| Comparative Example 3 | — | — | — | — | — | — | — | — | 0 | 0 | 0 | 0 | 0 |
| Comparative Example 4 | — | — | — | — | — | — | — | — | 0 | 0 | 0 | 0 | 0 |
| Example 4 | 23 | 0.1 | Sodium hydroxide | 24 h | 8.0 | 14.8 | 4.7 | 3.1 | 1.0 | 0.2 | 0.1 | 0.4 | 1.7 |
| Example 5 | 23 | 0.1 | Sodium hydroxide | 24 h | 8.0 | 13.2 | 4.2 | 3.1 | 3.0 | 0.5 | 0.2 | 0.8 | 4.5 |
| Example 6 | 23 | 0.1 | Sodium hydroxide | 24 h | 8.0 | 12.4 | 4.0 | 3.1 | 10.0 | 0.6 | 0.2 | 1.0 | 11.8 |

3. Rubber Composition for Tire Using Modified Polymer Having Alkoxysilyl Group Introduced in Main Chain Examples 7 to 9 and Comparative Examples 5 and 6

A rubber composition was prepared by using Banbury mixer. That is, according to the formulation (parts by mass) shown in Table 3 below, compounding ingredients excluding sulfur and a vulcanization accelerator were added to a rubber component, followed by kneading, in a first mixing stage, and sulfur and a vulcanization accelerator were then added to the kneaded material obtained, followed by kneading, in Vulcanization accelerator: "NOCCELER CZ" manufactured by Ouchi Shinko Chemical Industrial Co., Ltd.

Each rubber composition obtained was vulcanized at 160° C. for 20 minutes to prepare a test piece having a given shape. Using the test piece obtained, reversion resistance, reversion and deterioration resistance were evaluated. Furthermore, a dynamic viscoelasticity test was conducted using the test piece obtained, and wet grip performance and low fuel consumption performance were evaluated. Each evaluation method is as follows.

Reversion resistance: 150° C.×90 min vulcanization torque was measured with RHEOMETER MDR2000 manufactured by ALPHA TECHNOLOGIES, the change of the numerical value after 30 minutes was calculated from the time showing the maximum value of torque, and the reciprocal of the number was indicated by an index relative to the value of each control which is taken as 100. The larger the index, the small the decrease of torque and the better the reversion resistance.

Deterioration resistance: Tensile test was conducted using a sample after vulcanizing each rubber sample and a sample after deteriorating each rubber sample in a hot air circulating oven at 100° C. for 14 days, and the decreased numerical value of 300% modulus was measured. The reciprocal of the measurement value was indicated by an index relative to the value of each control which is taken as 100. Tensile test (dumbbell shape No. 3) according to JIS K6251 was conducted as the tensile test. The larger the index, the smaller the decrease of M300 and the better the deterioration resistance.

Wet grip performance: Loss factor tan δ was measured under the conditions of frequency: 50 Hz, static strain: 10%, dynamic strain: 2% and temperature: 0° C. using rheospectrometer E4000 manufactured by USM, and was indicated by an index relative to the value of each comparative example which is taken as 100. The tan δ at 0° C. is generally used as an index of grip performance (wet grip performance) to a wet road surface in a rubber composition for a tire, and the larger the index, the larger the tan δ, indicating a better wet performance to the kneaded material obtained, followed by kneading, in a final mixing stage. The detail of each component in Table 4, other than a rubber component, is as follows.

Silica: "NIPSIL AQ" manufactured by Tosoh Silica Corporation

Carbon black: "SEAST 3" manufactured by Tokai Carbon Co., Ltd.

Silane coupling agent: Bis-(3-triethoxysilylpropyl)tetrasulfide, "Si69" manufactured by EVONIK DEGUSSA Zinc flower: "Zinc Flower Grade 1" manufactured by Mitsui Mining & Smelting Co., Ltd.

Age resister: "NOCRAC 6C" manufactured by Ouchi Shinko Chemical Industrial Co., Ltd.

Stearic acid: "LUNAC S-20" manufactured by Kao Corporation

Process oil: "X-140" manufactured by JX Nippon Oil & Energy Corporation

Sulfur: "Powdered sulfur for rubber 150 mesh" manufactured by Hosoi Chemical Industry Co., Ltd.

Vulcanization accelerator: "NOCCELER CZ" manufactured by Ouchi Shinko Chemical Industrial Co., Ltd.

Each rubber composition obtained was vulcanized at 160° C. for 20 minutes to prepare a test piece having a given shape. Using the test piece obtained, a dynamic viscoelasticity test was conducted, wet grip performance and low fuel consumption performance were evaluated, and modulus of

TABLE 3

|  | Comparative Example 5 | Comparative Example 6 | Example 7 | Example 8 | Example 9 |
|---|---|---|---|---|---|
| Formulation (parts by mass) |  |  |  |  |  |
| Unmodified polymer (Comparative Example 1) | 100 |  |  |  |  |
| Decomposed polymer (Comparative Example 2) |  | 100 |  |  |  |
| Modified polymer A (Example 1) |  |  | 100 |  |  |
| Modified polymer B (Example 2) |  |  |  | 100 |  |
| Modified polymer C (Example 3) |  |  |  |  | 100 |
| Silica | 50 | 50 | 50 | 50 | 50 |
| Carbon black | 10 | 10 | 10 | 10 | 10 |
| Silane coupling agent | 4 | 4 | 4 | 4 | 4 |
| Zinc flower | 2 | 2 | 2 | 2 | 2 |
| Process oil | 2 | 2 | 2 | 2 | 2 |
| Age resister | 2 | 2 | 2 | 2 | 2 |
| Stearic acid | 2 | 2 | 2 | 2 | 2 |
| Sulfur | 2 | 2 | 2 | 2 | 2 |
| Vulcanization accelerator | 1.5 | 1.5 | 1.5 | 1.5 | 1.5 |
| Properties of rubber composition (index) |  |  |  |  |  |
| Reversion resistance | 100 | 100 | 112 | 114 | 115 |
| Deterioration resistance | 100 | 98 | 117 | 121 | 135 |
| Wet grip performance | 100 | 100 | 104 | 105 | 105 |
| Low fuel consumption performance | 100 | 101 | 118 | 121 | 128 |

As shown in Table 3, in Examples 7 to 9 using the modified polymers of the examples, wet grip performance and low fuel consumption performance were greatly improved as compared with each comparative example using only unmodified natural rubber or decomposed rubber, that is a rubber in which recombination was not conducted.

4. Rubber composition for tire using modified polymer having alkoxysilyl group introduced in molecular terminal Examples 10 to 12 and Comparative Examples 7 and 8

A rubber composition was prepared by using Banbury mixer That is, according to the formulation (parts by mass) shown in Table 4 below, compounding ingredients excluding sulfur and a vulcanization accelerator were added to a rubber component, followed by kneading, in a first mixing stage, and sulfur and a vulcanization accelerator were then added elasticity and tensile strength were measured. The evaluation methods of the wet grip performance and low fuel consumption performance are described above, and the measurement methods of modulus of elasticity and tensile strength are as follows.

Modulus of elasticity (M300): 300% modulus was measured by conducting a tensile test (dumbbell shape No. 3) according to JIS K6251, and was indicated by an index relative to the value of Comparative Example 7 which is taken as 100. The larger the index, the larger the modulus of elasticity (M300), indicating a higher stiffness.

Tensile strength: Strength at break was measured by conducting a tensile test (dumbbell shape No. 3) according to JIS K6251, and was indicated by an index relative to the value of Comparative Example 7 which is taken as 100. The larger the index, the higher the tensile strength, which is more favorable.

TABLE 4

| | Comparative Example 7 | Comparative Example 8 | Example 10 | Example 11 | Example 12 |
|---|---|---|---|---|---|
| Formulation (parts by mass) | | | | | |
| Unmodified polymer (Comparative Example 3) | 100 | | | | |
| Decomposed polymer (Comparative Example 4) | | 100 | | | |
| Modified polymer D (Example 4) | | | 100 | | |
| Modified polymer E (Example 5) | | | | 100 | |
| Modified polymer F (Example 6) | | | | | 100 |
| Silica | 50 | 50 | 50 | 50 | 50 |
| Carbon black | 10 | 10 | 10 | 10 | 10 |
| Silane coupling agent | 4 | 4 | 4 | 4 | 4 |
| Zinc flower | 2 | 2 | 2 | 2 | 2 |
| Process oil | 2 | 2 | 2 | 2 | 2 |
| Age resister | 2 | 2 | 2 | 2 | 2 |
| Stearic acid | 2 | 2 | 2 | 2 | 2 |
| Sulfur | 2 | 2 | 2 | 2 | 2 |
| Vulcanization accelerator | 1.5 | 1.5 | 1.5 | 1.5 | 1.5 |
| Properties of rubber composition (index) | | | | | |
| Wet grip performance | 100 | 100 | 103 | 104 | 104 |
| Low fuel consumption performance | 100 | 101 | 108 | 116 | 123 |
| Modulus of elasticity | 100 | 100 | 104 | 106 | 106 |
| Tensile strength | 100 | 96 | 105 | 106 | 107 |

As shown in Table 4, in Examples 10 to 12 using the modified polymers of the synthesis examples, wet grip performance and low fuel consumption performance were greatly improved as compared with each comparative example using only unmodified natural rubber or decomposed rubber, that is a rubber in which recombination was not conducted.

The invention claimed is:

1. A method for producing a modified polymer, comprising changing acido-basic properties of a system containing a polymer obtained by decomposing a polymer having a carbon-carbon double bond in a main chain by oxidative cleavage of the carbon-carbon double bond to decrease the molecular weight, and a functional molecule having an alkoxysilyl group in the structure such that the system is changed into a basic system when the system is acidic and the system is changed into an acidic system when the system is basic to combine the decomposed polymer and the functional molecule, thereby obtaining a modified polymer having an alkoxysilyl group introduced in a main chain or at least one molecular terminal.

2. The method for producing a modified polymer according to claim 1, comprising changing acido-basic properties of a system containing a polymer obtained by decomposing a polymer having a carbon-carbon double bond in a main chain by oxidative cleavage of the carbon-carbon double bond to decrease the molecular weight, and a trifunctional molecule having an alkoxysilyl group in the structure as represented by the following formula (A) such that the system is changed into a basic system when the system is acidic and the system is changed into an acidic system when the system is basic to combine the decomposed polymer and the trifunctional molecule, thereby obtaining a modified polymer having an alkoxysilyl group introduced in a main chain;

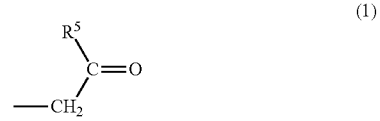

(A)

wherein $R^1$, $R^2$ and $R^3$ each represent an aldehyde group or a carbonyl group, and $R^4$ represents an alkyl group having from 1 to 10 carbon atoms.

3. The method for producing a modified polymer according to claim 2, wherein the decomposed polymer has a structure as represented by the following formula (1) in the terminal;

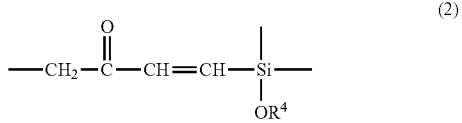

(1)

wherein $R^5$ represents a hydrogen atom or a methyl group.

4. The method for producing a modified polymer according to claim 2, wherein the trifunctional molecule having the alkoxysilyl group in the structure as represented by the formula (A) is obtained by oxidative cleavage of a carbon-carbon double bond in the trifunctional molecule having at least one vinyl group.

5. The method for producing a modified polymer according to claim 2, which obtains a modified polymer having at least one of bonding structures as represented by the following formulae (2) to (5):

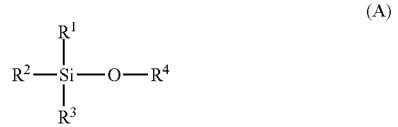

(2)

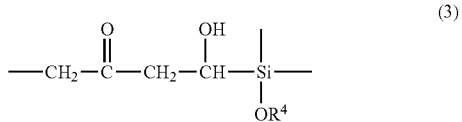

(3)

-continued

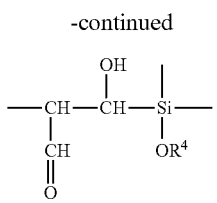
(4)

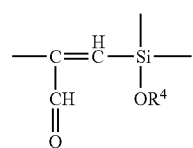
(5)

wherein $R^4$ represents an alkyl group having from 1 to 10 carbon atoms.

6. The method for producing a modified polymer according to claim 1, comprising changing acido-basic properties of a system containing a polymer obtained by decomposing a polymer having a carbon-carbon double bond in a main chain by oxidative cleavage of the carbon-carbon double bond to decrease the molecular weight, and a functional molecule having an alkoxysilyl group in the structure as represented by the following formula (a) such that the system is changed into a basic system when the system is acidic and the system is changed into an acidic system when the system is basic to combine the decomposed polymer and the functional molecule, thereby obtaining a modified polymer having an alkoxysilyl group introduced in at least one molecular terminal;

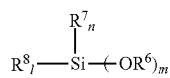
(a)

wherein $R^6$ represents an alkyl group having from 1 to 10 carbon atoms, $R^7$ represents an aldehyde group or a carbonyl group, $R^8$ represents an alkyl group having from 1 to 10 carbon atoms, m is a number of from 1 to 3, n is a number of 1 or 2, and l is a number of from 0 to 2.

7. The method for producing a modified polymer according to claim 6, wherein the decomposed polymer contains a structure as represented by the following formula (11) in a terminal;

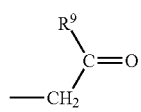
(11)

wherein $R^9$ represents a hydrogen atom or a methyl group.

8. The method for producing a modified polymer according to claim 6, wherein the functional molecule having the alkoxysilyl group in the structure as represented by the formula (a) is obtained by oxidative cleavage of a carbon-carbon double bond in the functional molecule having at least one vinyl group.

9. The method for producing a modified polymer according to claim 6, which obtains a modified polymer having a terminal group as represented by the following formula (b) in at least one molecular terminal;

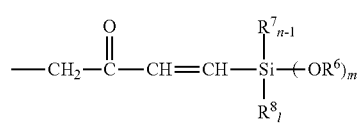
(b)

wherein $R^6$ represents an alkyl group having from 1 to 10 carbon atoms, $R^7$ represents an aldehyde group or a carbonyl group, $R^8$ represents an alkyl group having from 1 to 10 carbon atoms, m is a number of from 1 to 3, n is a number of 1 or 2, and l is a number of from 0 to 2.

10. A diene polymer in which a linking group containing at least one of bonding structures as represented by the following formulae (2) to (5) is present in the molecule and diene polymer chains are linked through the linking group:

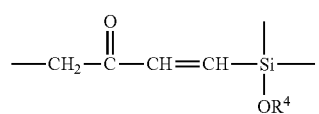
(2)

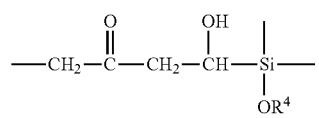
(3)

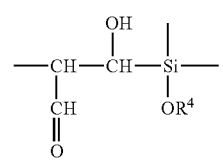
(4)

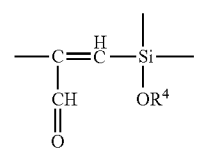
(5)

wherein $R^4$ represents an alkyl group having from 1 to 10 carbon atoms.

11. A rubber composition for a tire comprising 100 parts by mass of a modified diene rubber component that is the diene polymer according to claim 10 and contains from 1 to 5 mol % of an alkoxysilyl group in the main chain, and from 5 to 150 parts by mass of a filler.

12. The rubber composition for a tire according to claim 11, wherein the modified diene rubber is a modified isoprene rubber having polyisoprene chains as represented by the following formula (9) linked through the linking group;

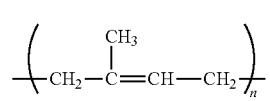
(9)

wherein n is an integer of 1 or more.

13. A diene polymer having a terminal group as represented by the following formula (b) in at least one molecular terminal of the diene polymer chain;

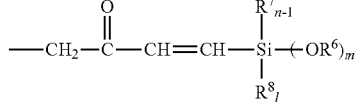
(b)

wherein $R^6$ represents an alkyl group having from 1 to 10 carbon atoms, $R^7$ represents an aldehyde group or a carbonyl group, $R^8$ represents an alkyl group having from 1 to 10 carbon atoms, m is a number of from 1 to 3, n is a number of 1 or 2, and l is a number of from 0 to 2, $R^6$, $R^7$, $R^8$, m, n and l are the same as $R^6$, $R^7$, $R^8$, m, n and l in the formula (a), respectively.

14. A rubber composition for a tire comprising 100 parts by mass of a modified diene rubber component that is the diene polymer according to claim 13 and contains from 0.01 to 5 mol % of an alkoxysilyl group, and from 5 to 150 parts by mass of a filler.

15. The rubber composition for a tire according to claim 14, wherein the modified diene rubber is a modified isoprene rubber having polyisoprene chains as represented by the following formula (19) through a bonding structure as represented by any of the following formulae (12) to (15):

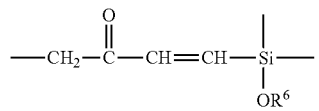
(12)

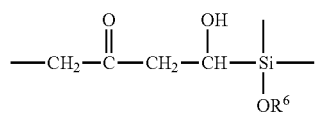
(13)

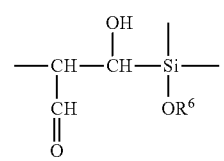
(14)

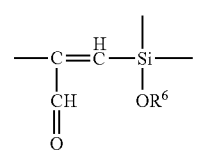
(15)

wherein $R^6$ represents an alkyl group having from 1 to 10 carbon atoms;

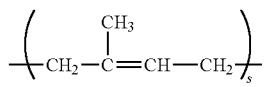
(19)

wherein s is an integer of 1 or more.

16. The rubber composition for a tire according to claim 11, containing silica as the filler in an amount of from 5 to 80 parts by mass per 100 parts by mass of the modified diene rubber component.

17. The rubber composition for a tire according to claim 11, containing carbon black as the filler in an amount of from 5 to 80 parts by mass per 100 parts by mass of the modified diene rubber component.

18. The rubber composition for a tire according to claim 14, containing silica as the filler in an amount of from 5 to 80 parts by mass per 100 parts by mass of the modified diene rubber component.

19. The rubber composition for a tire according to claim 14, containing carbon black as the filler in an amount of from 5 to 80 parts by mass per 100 parts by mass of the modified diene rubber component.

* * * * *